United States Patent Office 3,065,242
Patented Nov. 20, 1962

3,065,242
PRODUCTION OF ACYL HALIDES, CARBOXYLIC ACIDS AND LACTONES
Thomas Alderson and Vaughn Arthur Engelhardt, Wilmington, Del., assignors to E. I. du Pont de Nemours and Company, Wilmington, Del., a corporation of Delaware
No Drawing. Filed Feb. 23, 1960, Ser. No. 10,099
8 Claims. (Cl. 260—343.6)

This invention relates to a new method for synthesizing carboxylic compounds preferably acyl halides.

The conventional methods for preparing acyl halides involve reaction of inorganic halides with an acid, salt, or anhydride, chlorination of aldehydes, etc. Because of the importance of the acyl halides as chemical intermediates, there is a continuing technical interest in finding new and improved methods for their preparation.

According to this invention, carboxylic compounds preferably acyl halides are obtained by reacting an olefine with carbon monoxide and hydrogen chloride or bromide in the presence of a catalytic amount of a halide, carbonyl or chelate of a group VIII noble metal.

In practice a pressure reactor is charged with the catalyst, the reactor is closed, cooled to 0° C. or lower, evacuated, and a predetermined amount of hydrogen halide is added. The reactor is placed in a shaker box and an olefin:carbon monoxide mixture preferably in equimolar proportions is then introduced in amount sufficient to provide a pressure at reaction temperature of at least 50 atmospheres. The charge is then agitated and heated at a temperature of 50° to 250° C. until there is no further reaction, as evidenced by cessation of pressure drop. Throughout the reaction period the pressure within the reactor is maintained by injection of fresh olefin:carbon monoxide mixed gas. After reaction is complete, the reactor is allowed to cool, unreacted gases are vented to the atmosphere, and the reactor is discharged. The desired acyl halide is separated from the reaction mixture by distillation or other method known to those skilled in the art.

In an alternative procedure the reactor may be charged with the olefin and then with hydrogen halide and carbon monoxide.

In still another alternative method, the reactor may be charged with hydrogen halide and carbon monoxide and then the olefin may be injected.

It is to be understood that there is nothing critical about the order of charging the reactants to the reactor and therefore that they may be added in any order which is convenient and practical.

The examples which follow illustrate but do not limit this invention. The reactor used corresponds to a capacity of 400 ml. of water and parts are by weight unless otherwise specified. Yields given are based on the hydrogen halide charged to the reactor.

The products obtained in accordance with the invention are carboxylic compounds. Depending on the recovery conditions, the acyl halides or their hydrolysis products, the free acids, may be obtained. Examples VI, VII, and VIII illustrate the preparation of butyrolactones. While applicant does not wish to be bound by any particular theory of operation, it is postulated that in all instances, an acyl halide had formed as an intermediate product which depending on recovery techniques converted to the indicated final product.

EXAMPLE I

A silver-lined pressure reactor is charged with one part of rhodium trichloride and two parts of silver metal. The reactor is cooled, evacuated, and 50 parts of anhydrous hydrogen chloride is added by distillation. The system is then pressured with a 1:1 ethylene: CO mixture and the charge is heated at 170°–210° C. and 600–1000 atm. for 16 hours. A pressure drop of 1590 atm. is observed during this reaction period. There is recovered 212 parts of black reaction product which is steam distilled. There is thus obtained a cloudy distillate which is extracted three times with diethyl ether. The extract is dried over anhydrous magnesium sulfate and the ether solution is fractionally distilled. From this distillation there is obtained 70 parts of propionic acid, B.P. 51° C./18 mm.; $n_D^{25}$, 1.3847; N.E., 74.08 (calcd. N.E. for propionic acid, 74). The identification of this material is confirmed by infrared analysis. The aqueous residue from the steam distillation is also extracted with ether, the ether extract is dried over anhydrous magnesium sulfate, and fractionally distilled. By this procedure there is obtained an additional 21 parts of propionic acid, B.P. 60° C./28.5 mm.; $n_D^{25}$, 1.3847; N.E., 73.3. The total yield of propionic acid isolated in this case is 90%.

The above example is repeated using bis(2-pyridine aldehyde) rhodium(III) chloride as the catalyst with similar results.

EXAMPLE II

A silver-lined pressure reactor is charged with 0.5 part of rhodium(III) acetylacetonate and two parts of silver gauze. The reactor is then pressured with 50 parts of anhydrous hydrogen chloride and a 1:1 ethylene:carbon monoxide mixture to give a pressure of 600–1000 atm. at 170–210° C. These conditions are maintained for 16 hours. A pressure drop of 955 atm. is observed during this reaction period. Following the procedure outlined in example I, there is obtained a 50% yield of propionic acid.

The above example is repeated using decene-1 in place of ethylene with formation of undecanoic acid.

EXAMPLE III

A silver-lined pressure reactor is charged with one part of ruthenium trichloride and two parts of silver metal. The reactor is cooled, evacuated, and 50 parts of anhydrous hydrogen chloride is added by distillation. The system is pressured with a 1:1 ethylene:carbon monoxide mixture and the reactants are heated at 170–210° C. and 600–1000 atm. for 16 hours. A pressure drop of 340 atm. is observed during this reaction period. There are obtained approximately 50 parts of ethyl chloride, four parts of propionyl chloride, and two to three parts of ethyl propionate, identified by infrared analysis.

EXAMPLE IV

A silver-lined pressure reactor is charged with 79 parts of cyclohexane, one part of rhodium trichloride, and one part of silver metal. The reactor is cooled, evacuated, and 50 parts of anhydrous hydrogen chloride and 56 parts of butene-1 are added by distillation. The reactor is pressured with carbon monoxide and shaken at 210° C. and 960 atm. for 16 hours. A pressure drop of 160 atm. occurs during the reaction period. Following the isolation procedure outlined in example I, there are obtained a mixture of iso- and n-valeric acids in 5% total yield and 61 parts of 2-chlorobutane.

EXAMPLE V

Following the procedure outlined in the preceding example the reactor is charged with one part of rhodium trichloride, 50 parts of anhydrous hydrogen chloride, 56 parts of isobutylene, and 80 parts of cyclohexane. The reaction mixture is heated at 210° C. and 1000 atm. pressure of carbon monoxide for 16 hours. A pressure drop of 65 atm. is observed during this reaction period. Following the isolation procedure outlined in Example IV, there are obtained a 10% yield of pivalic acid (B.P. 51°

C./4 mm.; $n_D^{25}$, 1.4090) and a 3–4% yield of acidic materials boiling from 63° C./3 mm. to 86° C./1.5 mm.; $n_D^{25}$, 1.4579; N.E., 368.3. The identity of these compounds is confirmed by infrared analysis. There is also obtained 10 parts of tert.-butyl chloride.

EXAMPLE VI

A silver-lined pressure reactor is charged with one part of rhoduim trichloride and two parts of silver gauze. The reactor is cooled, evacuated, and 33 parts of butadiene and 50 parts of anhydrous hydrogen chloride are added by distillation. The cold reactor is pressured with carbon monoxide to about 200 atm. and the charge is then heated at 190° C. and 950 atm. carbon monoxide pressure for 16 hours. A pressure drop of slightly more than 40 atm. is observed during this reaction period. Following the isolation procedure outlined in Example I, there is obtained a 10% yield of α-methylbutyrolactone, B.P. 73° C./2 mm.; $n_D^{25}$, 1.4329. This material is identified by infrared analysis. In addition, there is obtained six parts of hydrocarbons boiling from 48° C. to about 150° C. and having a refractive index range of 1.3656–1.4400 at 25° C.

The above experiment is repeated, except that 79 parts of cyclohexane is included in the charge and the reaction is carried out at 190° C. and 995 atm. of carbon monoxide for 16 hours. Under these conditions a pressure drop of 85 atm. is observed. There is obtained from the reaction mixture six parts of α-methylbutyrolactone, B.P. 81° C./2.3 mm.; $n_D^{25}$, 1.4411, which is identified by infrared analysis. In addition, there is obtained 18 parts of 1,3-dichlorobutane.

Repetition of the above experiment using rhodium tetracarbonyl in place of the rhodium chloride gives similar results.

EXAMPLE VII

The preceding example is repeated substituting rhodium(III) acetylacetonate for the rhodium chloride. The reaction conditions in this experiment are 195° C. and 950 atm. A pressure drop of 90 atm. is observed during a 16-hour reaction period. From this experiment there are recovered a 10% yield of α-methylbutyrolactone, $n_D^{25}$, 1.4350, along with six parts of 1,3-dichlorobutane. These compounds are identified by infrared analysis.

EXAMPLE VIII

A silver-lined pressure reactor is charged with 45 parts of 1,5-hexadiene, 0.5 part of rhodium(III) acetylacetonate, and two parts of silver gauze. The reactor is cooled, evacuated, 50 parts of anhydrous hydrogen chloride is distilled in, and the system is pressured with carbon monoxide while still cold. The reactants are heated at 210° C. and 950 atm. carbon monoxide pressure for 16 hours. A pressure drop of 10 atm. is observed during this reaction period. Using the previously outlined isolation procedure, there are obtained a 10% yield of α-propylbutyrolactone, B.P. 52° C./0.8 mm.; $n_D^{25}$, 1.4343, identified by infrared analysis, and 22 parts of chlorinated hydrocarbons which have a refractive index, $n_D^{25}$, of 1.4430.

Results similar to the above are obtained using palladium fluoride as the catalyst in place of rhodium(III) acetylacetonate.

The above experiment is repeated using hydrogen bromide in place of the hydrogen chloride and ruthenium tribromide in place of the rhodium catalyst with similar results.

EXAMPLE IX

This example illustrates the profound effect of the catalyst in increasing the yield of desired acid chloride.

Part A

A pressure reactor is charged with 40 parts of cyclohexane, one part of rhodium trichloride, and one part of silver metal. The reactor is cooled and evacuated and 50 parts of anhydrous hydrogen chloride is distilled in. The system is pressured with a 1:1 ethylele:carbon monoxide gas mixture to give a pressure of 660–1000 atm. at 150–180° C. These conditions are maintained for 16 hours. During this period a pressure drop of 505 atm. is observed. There is removed from the reactor 162 parts of red-brown liquid which is flash distilled from the catalyst to give 153 parts of distillate and 9 parts of residue. The distillate is then fractionally distilled to yield 109 parts of propionyl chloride, B.P. 76.5° C., $n_D^{25}$, 1.4014, N.E. 46.2 (calculated N.E. for $C_3H_5OCl$, 46.2); 10 parts of propionic acid anhydride, B.P. 58° C./10 mm., $n_D^{25}$, 1.4059, identified by infrared analysis.

Part B

A pressure reactor is charged with 40 parts of cyclohexane, cooled and evacuated, and 50 parts of anhydrous hydrogen chloride is distilled in. The system is pressured with a 1:1 ethylene:carbon monoxide gas mixture to give an operating pressure of 800–925 atm. at 158–182° C. These conditions are maintained for 16 hours. A pressure drop of 245 atm. is observed during this period. There is recovered from the reaction mixture 75 parts of ethyl chloride (92% yield), about 2 parts of propionyl chloride detected by infrared analysis, and the cyclohexane solvent.

EXAMPLE X

A pressure reactor is charged with 41 parts of cyclohexene, one part of rhodium trichloride, and one part of silver metal. The reactor is cooled and evacuated and 37 parts of anhydrous hydrogen chloride is distilled in. The system is pressured with carbon monoxide to give an operating pressure of 1000 atm. at 225° C. These conditions are maintained for 16 hours. A pressure drop of 15 atm. is observed during this period. There is recovered from the reactor 41 parts of red-brown liquid which is flash distilled to yield 32 parts of distillate and 8 parts of residue. The distillate is fractionally distilled to yield four parts of monochlorocyclohexane, B.P. 120° C., $n_D^{25}$, 1.4560, further identified by infrared analysis; four parts of chlorocyclohexane, identified by infrared analysis; approximately 10 parts of cyclohexane carboxylic acid, B.P. 89–100° C./2 mm., N.E. 166, and three parts of an alicyclic carboxylic acid, B.P. 289–291° C., $n_D^{25}$, 1.5180, N.E. 765, identified by infrared analysis.

EXAMPLE XI

A silver-lined pressure reactor is charged with 100 parts of 36.5% aqueous hydrogen chloride, 40 parts of cyclohexane, one part of rhodium trichloride, and one part of silver powder. The reactor is cooled and evacuated, pressured with a 1:1 ethylene:carbon monoxide mixture and shaken at 102–170° C./340–640 atm. pressure for 16 hours. A pressure drop of 1180 atm. is observed during the reaction period. There is recovered from the reactor 340 parts of red-brown liquid which is flash distilled to yield 318 parts of distillate and five parts of acetone-soluble tar. The distillate is fractionally distilled to yield 28 parts of a 1:1 mixture of propionyl chloride and cyclohexane, B.P. 69–73° C., $n_D^{25}$, 1.4102, N.E., 136, identified by infrared analysis; 203 parts of propionic acid, B.P. 54° C./19 mm. (corrected 142° C.), $n_D^{25}$, 1.3848, N.E. 73.9 (calc'd N.E. for $C_3H_6O_2$=74), identified by infrared analysis; and 63 parts of propionic anhydride, B.P. 73° C./20 mm. (corrected 165° C.), $n_D^{25}$, 1.4022, N.E. 65 (calc'd N.E. for $C_6H_{10}O$=65), identified by infrared analysis.

As illustrated by the detailed examples, the use of a reaction medium is not necessary. When a reaction medium is employed, it may be selected from among the aromatic, aliphatic and cycloaliphatic hydrocarbons, e.g., benzene, toluene, cyclohexane, methylcyclohexane, isobutane, hexane, and the like, alkene halides, e.g., methylene chloride, carbon tetrachloride, and the like.

The amount of reaction medium is not critical and generally, it equals or exceeds by 10 or more fold the combined weights of the olefin and hydrogen halide.

The reactor used should be of a material which is not attacked by any of the reactants. In the examples where a silver-lined reactor was used, additional silver was present to protect the lining. However, such precaution need not be taken where the reactor is made of glass, Hastelloy or other material which may be used for the reactor.

The relative proportions of the reactants employed may vary over wide ranges. The olefin, carbon monoxide and hydrogen halide react in a 1:1:1 molar ratio in the formation of acyl halides and other carboxylic compounds. Thus while the ratio of olefin to carbon monoxide may vary from 10 to 1 or greater to 1 to 10 or even less, a substantially equimolar ratio is preferred for economic reasons. Since the olefins are usually gaseous, it is convenient to charge them along with carbon monoxide in a 1:1 molar ratio to provide the desired reaction pressure. A metered amount of hydrogen halide is ordinarily added first to the reactor containing the catalyst, and the reactor is pressured with the olefin:carbon monoxide mixture in an amount such that there exists at least one mol of olefin or carbon monoxide (whichever is present in least amount) for each mol of hydrogen halide. However, the hydrogen halide may be present in excess over that required to react on an equimolar basis. Thus it may exceed by 10 or more fold the number of mols of olefin or carbon monoxide supplied.

The process is carried out at a temperature of at least 50° C. Usually, however, a temperature in the range of 80° to 250° C. is employed because within this range the best results are obtained from the standpoint of product yield and rate of reaction.

As a rule the reaction is carried on until there is no further pressure drop. Throughout the period of reaction the pressure within the reactor is maintained by periodic injections of carbon monoxide-olefin mixture at between about 50 and 3,000 atmospheres, preferably 700 to 1500 atmospheres at the reaction temperature.

The reaction is conducted in the presence of a catalytic amount of a chelate, halide, or carbonyl of a group VIII noble metal, which is usually up to 15% by weight of the hydrogen halide charged into the reactor. Amounts as low as 0.0001% can be used, but usually larger amounts in the range of 0.1% are used to obtain practical rates of reaction.

The chelates, halides and carbonyls used are those compounds of the group VIII noble metals which are soluble in the reaction mixture at reaction conditions, in an amount sufficient to provide at least 0.0001% thereof, based on the hydrogen halide charged to the reactor. Specific examples are ruthenium dichloride, trichloride and tetrachloride, ruthenium triiodide, rhodium trichloride and tetrachloride, diruthenium nonacarbonyl, monoruthenium pentacarbonyl, rhodium tetracarbonyl, [Rh(CO)$_4$]$_2$ and [Rh(CO)$_4$]$_x$, rhodium tetracarbonyl hydride, rhodium dicarbonyl chloride, ruthenium(III) acetonylacetonate, rhodium(III) acetylacetonate, rhodium(III) bis(dibenzoylmethanate)monoacetate, bis(2-pyridine aldehyde) rhodium(III) chloride, rhodium (III) ethyl acetoacetate chelate, chelate of ruthenium with 5,8-diaza-4,9-dimethyl-4,8-dodecadiene-2,11-dione, platinum chloride and iodide, palladium fluoride, osmium chloride, iridium bromide and the like. Among the chelates, those preferred are those of 1,3-diketones, particularly acetylacetone. The preferred catalysts are the halides of the noble metals because they give superior results of desired products.

The olefins used in the practice of this invention are the mono- and dienic hydrocarbons whose sole aliphatic unsaturation is ethylenic. These mono- and diolefins may be straight, carbocyclic or branched chain. The unsaturation may be terminal or it may be internal and may be conjugated or not. For practical reasons, it is preferred that the olefins conform to the following formula

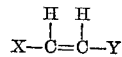

wherein X and Y which may be the same or different are selected from the group consisting of hydrogen, alkyl, cycloalkyl and aryl of up to and including eight carbon atoms free of acetylenic unsaturation. Preferably the olefins are terminally unsaturated, that is, compounds of the above formula wherein X represents hydrogen. Examples of usefully employable olefins are ethylene, propylene, butylenes, hexenes, octenes, decenes, octadecenes, eicosenes, butadiene, 2,3-dimethylbutadiene, 1,4- and 1,5-hexadiene, phenylbutadienes, 2,4-hexadiene, 3-propyloctene-1, 2,3-dibutylhexene-1, cyclohexene, methyl cyclohexene, and the like.

The hydrogen halides used in the practice of this invention are those HX compounds in which X is chlorine, or bromine, preferably the former. The hydrogen halide is ordinarily used in anhydrous form but concentrated aqueous solutions are also operative. When the reaction is to be carried out to produce acyl halides as the principal product, the anhydrous form is employed.

The process of this invention is an improvement over previously known methods for synthesizing carboxylic compounds in that it is a one-step operation which employs readily available olefins, carbon monoxide, and hydrogen halides as precursors, and produces the desired products in high yields. No by-products which require disposal result.

What is claimed is:

1. In the process of preparing acyl halides and their corresponding carboxylic acids and lactones, the step which comprises reacting, at a temperature of from 50 to 250° C. and a pressure of 50 to 3,000 atmospheres, an olefin selected from the group consisting of mono- and dienic hydrocarbons of up to 20 carbon atoms and whose sole aliphatic unsaturation is 1-2 ethylenic bonds, with carbon monoxide and a hydrogen halide selected from the group consisting of hydrogen bromide and hydrogen chloride in the presence of at least 0.0001%, by weight of the hydrogen halide, of a catalyst which consists essentially of a member selected from the group consisting of chelates, halides and carbonyls of group VIII noble metals.

2. The process of claim 1 wherein the temperature is within the range of 80 to 250° C. and the pressure is between 700 and 1500 atmospheres.

3. The process of claim 1 wherein the catalyst is a halide.

4. The process of claim 1 wherein the hydrogen halide is hydrogen chloride.

5. The process of claim 4 wherein the olefin is selected from the group consisting of ethylene, butene-1, isobutylene, butadiene, 1,5-hexadiene and cyclohexene.

6. The process of claim 4 wherein the catalyst is rhodium trichloride and the olefin is selected from the group consisting of ethylene, butene-1, isobutylene, butadiene and cyclohexene.

7. The process of claim 4 wherein the catalyst is ruthenium trichloride and the olefin is ethylene.

8. The process of claim 4 wherein the catalyst is rhodium (III) acetylacetonate and the olefin is selected from the group consisting of ethylene, butadiene and 1,5-hexadiene.

References Cited in the file of this patent

UNITED STATES PATENTS 2,876,254   Jenner et al. _____ Mar. 3, 1959